US012603436B2

(12) United States Patent
Nafe et al.

(10) Patent No.: US 12,603,436 B2
(45) Date of Patent: Apr. 14, 2026

(54) ELECTRONIC DEVICES WITH LOWER ANTENNA SWITCHING

(71) Applicant: Apple Inc., Cupertino, CA (US)

(72) Inventors: Ahmed Ali Abdelhaliem Nafe, Cupertino, CA (US); Ali Pourghorban Saghati, San Jose, CA (US); Ana Papio Toda, San Jose, CA (US); Carlo Di Nallo, Belmont, CA (US); Enrique Ayala Vazquez, Watsonville, CA (US); Erdinc Irci, Sunnyvale, CA (US); Hao Xu, Cupertino, CA (US); Hongfei Hu, Cupertino, CA (US); Jingni Zhong, Santa Clara, CA (US); Mattia Pascolini, San Francisco, CA (US); Ming Chen, Cupertino, CA (US); Mohsen Salehi, San Jose, CA (US); Nikolaj P Kammersgaard, Copenhagen (DK); Orbay Tuncay, San Jose, CA (US); Salih Yarga, San Jose, CA (US); Seyed Mohammad Amjadi, Santa Clara, CA (US); Tiejun Yu, Fremont, CA (US); Yiren Wang, Cupertino, CA (US); Yuan Tao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 18/464,999

(22) Filed: Sep. 11, 2023

(65) Prior Publication Data

US 2025/0087890 A1 Mar. 13, 2025

(51) Int. Cl.
*H01Q 9/04* (2006.01)
*H01Q 3/24* (2006.01)

(52) U.S. Cl.
CPC ............ *H01Q 9/0485* (2013.01); *H01Q 3/24* (2013.01)

(58) Field of Classification Search
CPC ............ H01Q 1/243; H01Q 3/24; H01Q 9/04; H01Q 9/0485; H01Q 21/24; H01Q 21/28; H01Q 21/29; H01Q 5/378
See application file for complete search history.

(56) References Cited

U.S. PATENT DOCUMENTS 9,755,298 B2 9/2017 Choi et al.
11,205,834 B2 12/2021 Ayala Vazquez et al.
(Continued)

FOREIGN PATENT DOCUMENTS

WO 2022055690 A1 3/2022

*Primary Examiner* — Jason M Crawford
(74) *Attorney, Agent, or Firm* — Treyz Law Group, P.C.; Michael H. Lyons

(57) ABSTRACT

An electronic device may be provided with wireless circuitry and a housing having peripheral conductive housing structures. The wireless circuitry may include first and second antennas. The first antenna may have a resonating element arm formed from a first segment of the peripheral conductive housing structures. The second antenna may have a resonating element arm formed from a second segment of the peripheral conductive housing structures separated from the first segment by a gap. Switchable short paths may be coupled between the second segment and ground on opposing sides of an antenna feed for the second antenna and/or may be coupled between the first and second segments and ground on opposing sides of the gap. Additionally or alternatively, a switch may be coupled between the first and second segments across the gap and a tuning component may couple the second segment to the ground structures.

20 Claims, 10 Drawing Sheets

(56) References Cited

U.S. PATENT DOCUMENTS

| | | | | |
|---|---|---|---|---|
| 12,107,335 | B2 * | 10/2024 | Li | H04M 1/026 |
| 2017/0194709 | A1 | 7/2017 | Jansson | |
| 2019/0027833 | A1 * | 1/2019 | Ayala Vazquez | H01Q 5/342 |
| 2019/0165836 | A1 * | 5/2019 | Irci | H04B 5/48 |
| 2019/0260112 | A1 * | 8/2019 | Azad | H01Q 9/42 |
| 2019/0393586 | A1 * | 12/2019 | Ayala Vazquez | H01Q 5/328 |
| 2021/0075090 | A1 * | 3/2021 | Yarga | H01Q 1/241 |
| 2021/0399429 | A1 * | 12/2021 | Garrido Lopez | H01Q 1/44 |
| 2022/0094059 | A1 * | 3/2022 | Wang | H01Q 21/28 |
| 2023/0003914 | A1 | 1/2023 | Widmer et al. | |
| 2023/0043326 | A1 | 2/2023 | Kim et al. | |
| 2023/0291124 | A1 * | 9/2023 | Ayala Vazquez | H01Q 1/243 |
| 2023/0291125 | A1 * | 9/2023 | Ayala Vazquez | H01Q 13/10 |
| 2024/0079766 | A1 * | 3/2024 | Xu | H01Q 5/328 |
| 2025/0087890 | A1 * | 3/2025 | Nafe | H01Q 9/42 |

* cited by examiner

| TUNING STATE | SWITCH 90 | SWITCH 92 | COVERAGE |
|---|---|---|---|
| A | ON | ON | MB+HB |
| B | OFF | OFF | LB |
| C | ON | OFF | LB+MB+HB |

103

ELECTRONIC DEVICES WITH LOWER ANTENNA SWITCHING

FIELD

This relates generally to electronic devices, including electronic devices with wireless communications capabilities.

BACKGROUND

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. The wireless circuitry may include first and second antennas. The first antenna may have a resonating element arm formed from a first segment of the peripheral conductive housing structures. The second antenna may have a resonating element arm formed from a second segment of the peripheral conductive housing structures separated from the first segment by a gap. The first antenna may be fed by a first radio-frequency path coupled to the first segment. The second antenna may be fed by a second radio-frequency path coupled to the second segment.

Switchable short paths may be coupled between the second segment and ground on opposing sides of an antenna feed for the second antenna. Additionally or alternatively, switchable short paths may be coupled between the first and second segments and ground on opposing sides of the gap. The switchable short paths may be adjusted between different states to boost the frequency response of the first and/or second antenna in one or more bands. Additionally or alternatively, a switch may be coupled between the first and second segments across the gap and a tuning component may couple the second segment to the ground structures. The switch and the tuning component may be adjusted between different states to boost the frequency response of the first and/or second antenna in one or more bands.

DETAILED DESCRIPTION

Figure 1:
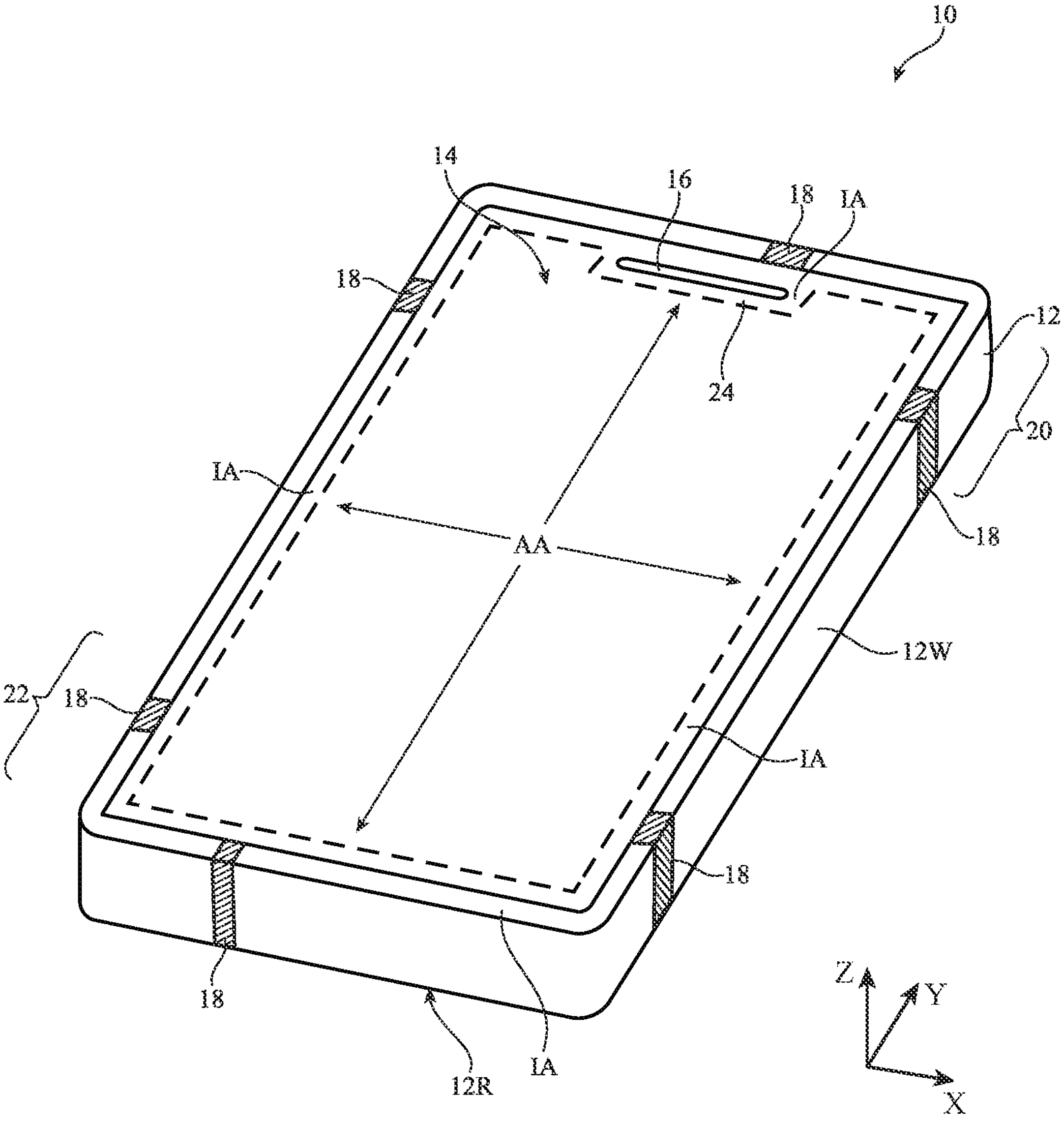
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is illustrative and non-limiting.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area LA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is illustrative and non-limiting. If desired, housing 12 may have other shapes (e.g., a square shape, cylindrical shape, spherical shape, combinations of these and/or different shapes, etc.).

Figure 2:
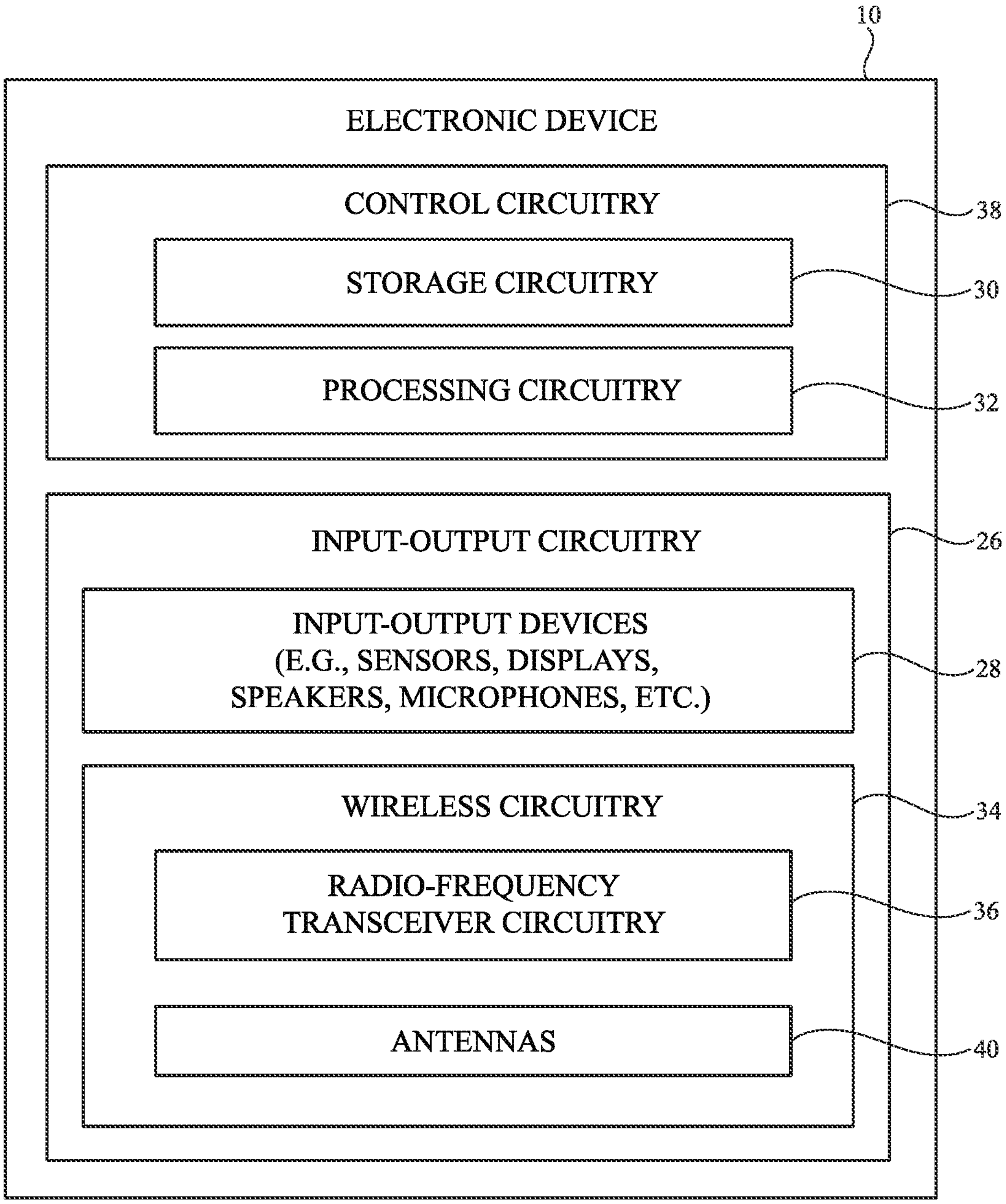
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHZ, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
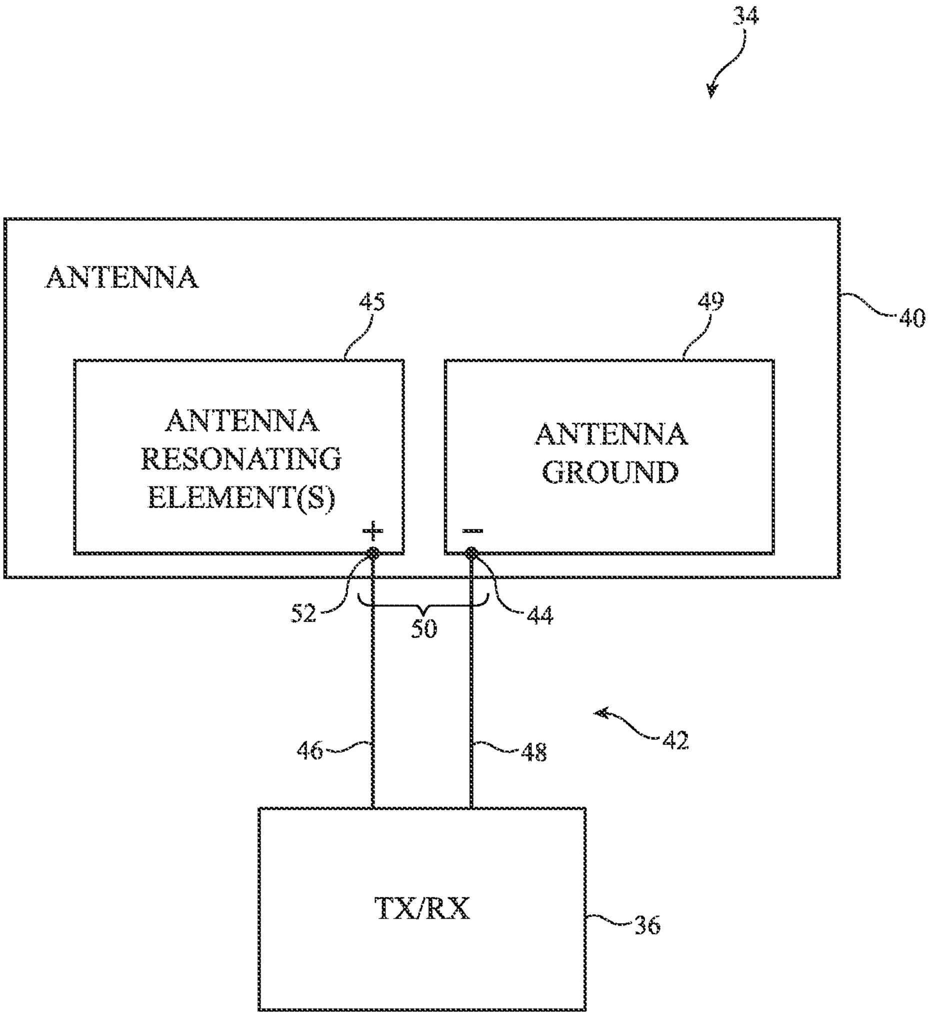
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to at least one antenna resonating element 45 and a ground antenna feed terminal 44 coupled to antenna ground 49. If desired, one or more conductive paths (sometimes referred to herein as ground paths, short paths, or return paths) may couple antenna resonating element(s) 45 to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
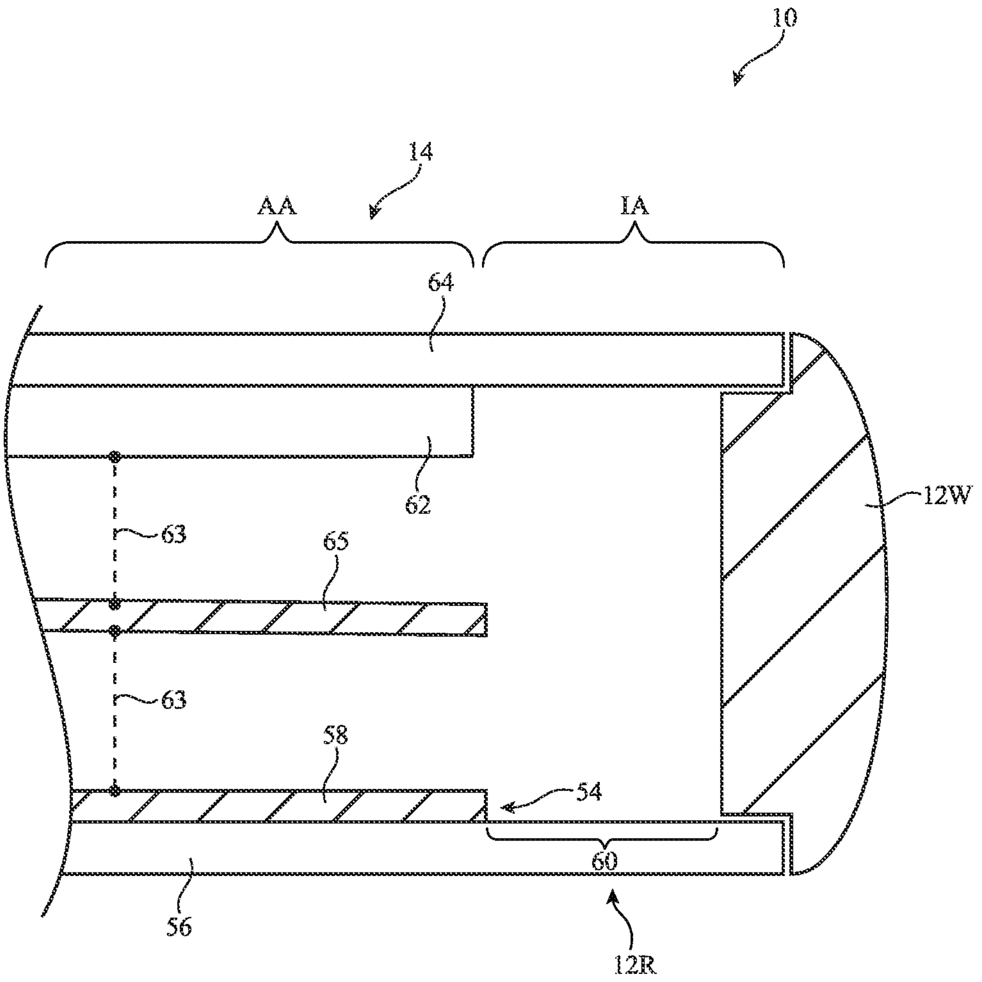
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). Conductive support plate 58 may be adhered to dielectric cover layer 56 or may be removable from dielectric cover layer 56. If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
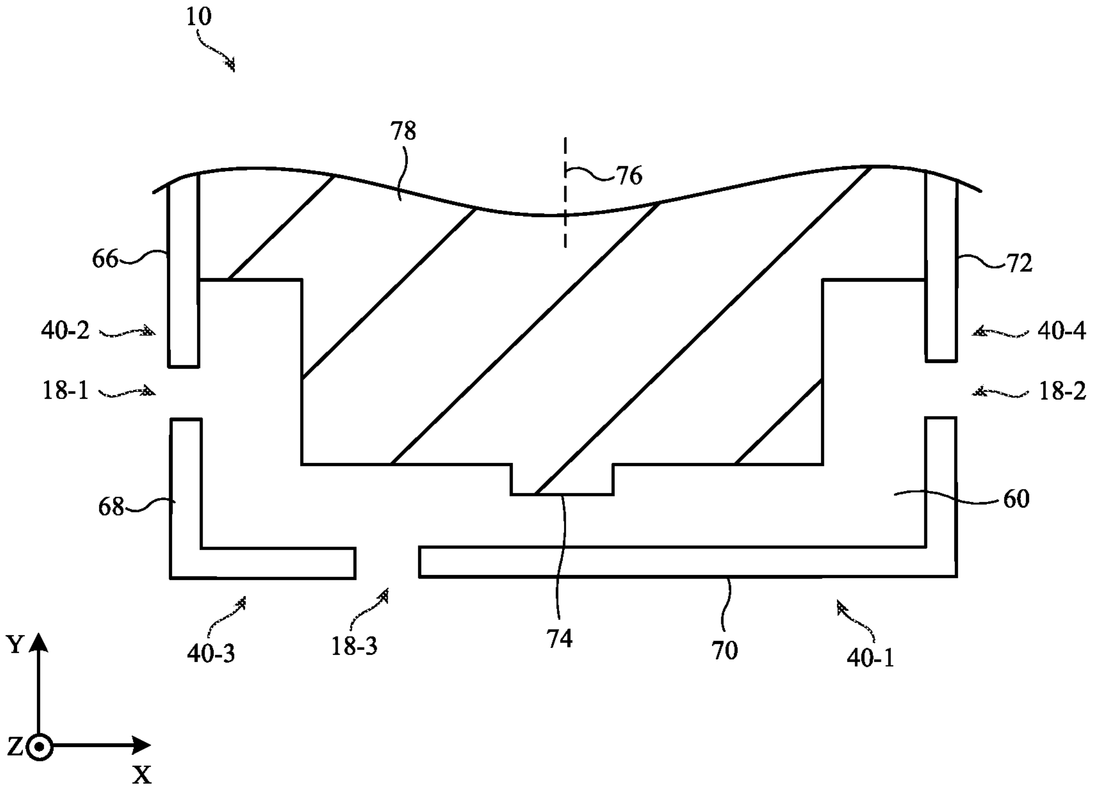
FIG. 5 is a top interior view of the lower end of an illustrative electronic device having peripheral conductive housing structures with a dielectric gap for separating the resonating elements of two antennas in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how the lower end of device 10 (e.g., within region 22 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10 (not shown in FIG. 5), a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 66 of peripheral conductive housing structures 12W from segment 68 of peripheral conductive housing structures 12W. Gap 18-2 may divide the third conductive sidewall to separate segment 72 from segment 70 of peripheral conductive housing structures 12W. Gap 18-3 may divide the fourth conductive sidewall to separate segment 68 from segment 70 of peripheral conductive housing structures 12W. In this example, segment 68 forms the bottom-left corner of device 10 (e.g., segment 68 may have a bend at the corner) and is formed from the first and fourth conductive sidewalls of peripheral conductive housing structures 12W (e.g., in lower region 22 of FIG. 1). Segment 70 forms the bottom-right corner of device 10 (e.g., segment 70 may have a bend at the corner) and is formed from the third and fourth conductive sidewalls of peripheral conductive housing structures 12W (e.g., in lower region 22 of FIG. 1).

Device 10 may include ground structures 78 (e.g., structures that form part of the antenna ground for one or more of the antennas in device 10). Ground structures 78 may include one or more metal layers such as a metal layer used to form a rear housing wall and/or an internal support structure for device 10 (e.g., conductive support plate 58 of FIG. 4), conductive traces on a printed circuit board, conductive portions of one or more components in device 10, conductive portions of display module 62 (FIG. 4), conductive interconnect structures that couple two or more of these structures together (e.g., conductive pins, conductive adhesive, welds, conductive tape, conductive foam, conductive springs, etc.), etc.

Ground structures 78 may extend between opposing sidewalls of peripheral conductive housing structures 12W. For example, ground structures 78 may extend from segment 66 to segment 72 of peripheral conductive housing structures 12W (e.g., across the width of device 10, parallel to the X-axis of FIG. 5). Ground structures 78 may be welded or otherwise affixed to segments 66 and 72. In another suitable arrangement, some or all of ground structures 78, segment 66, and segment 72 may be formed from a single, integral (continuous) piece of machined metal (e.g., in a unibody configuration). Ground structures 78 may include a ground extension 74 that protrudes into slot 60 and that may, if desired, bridge slot 60 and couple the ground structures to the peripheral conductive housing structures. Ground extension 74 may be formed from a data connector for device 10, as one example. Device 10 may have a longitudinal axis 76 that bisects the width of device 10 and that runs parallel to the length of device 10 (e.g., parallel to the Y-axis).

As shown in FIG. 5, slot 60 may separate ground structures 78 from segments 68 and 70 of peripheral conductive housing structures 12W (e.g., the upper edge of slot 60 may be defined by ground structures 78 whereas the lower edge of slot 60 is defined by segments 68 and 70). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 78, segment 66, segment 68, segment 70, and portions of slot 60 may be used in forming multiple antennas 40 in the lower region of device 10 (sometimes referred to herein as lower antennas). For example, device 10 may include an antenna 40-3 (sometimes referred to herein as ANT3) having an antenna resonating (radiating) element formed from segment 68 and having an antenna ground formed from ground structures 78. Device 10 may include an antenna 40-1 (sometimes referred to herein as ANT1) having an antenna resonating element formed from segment 70 and having an antenna ground formed from ground structures 78. Device 10 may include an antenna 40-2 having a slot antenna resonating element formed from a portion of slot 60 between segment 66 and ground structures 78. Device 10 may include an antenna 40-4 having a slot antenna resonating element formed from a portion of slot 60 between segment 72 and ground structures 78. Antennas 40-1 and 40-3 may be, for example, inverted-F antennas having a return path that couples the respective resonating element arms to the antenna ground. Antennas 40-1, 40-2, 40-3, and 40-4 may convey radio-frequency signals in one or more frequency bands. For example, antennas 40-1 and 40-3 may convey radio-frequency signals in at least the cellular low band (LB), the cellular midband (MB), and/or the cellular high band (HB). This may allow antennas 40-1 and 40-3 to perform MIMO communications in one or more of these bands, thereby maximizing data throughput.

In the example of FIG. 5, segment 68 has less overall length than segment 70 (e.g., longitudinal axis 76 of device 10 runs through segment 70 but not segment 68). It can therefore be difficult to configure antenna 40-3 to cover relatively low frequencies with the same antenna efficiency as antenna 40-1, such as frequencies within the cellular low band. In addition, ground extension 74 may have a relatively large size, such as in scenarios where ground extension 74 is formed from a relatively large data connector such as a data connector that supports data transfer using a USB-C protocol (e.g., a USB-C connector or port). The presence of ground extension 74 may also make it difficult for one or both of antennas 40-1 and 40-3 to cover the cellular low band. Further, the close physical distance between antennas 40-3 and 40-1 can produce relatively high electromagnetic coupling between the antennas which, if care is not taken, can affect the performance of one or both antennas when operating in a standalone (e.g., SISO) mode.

Figure 6:
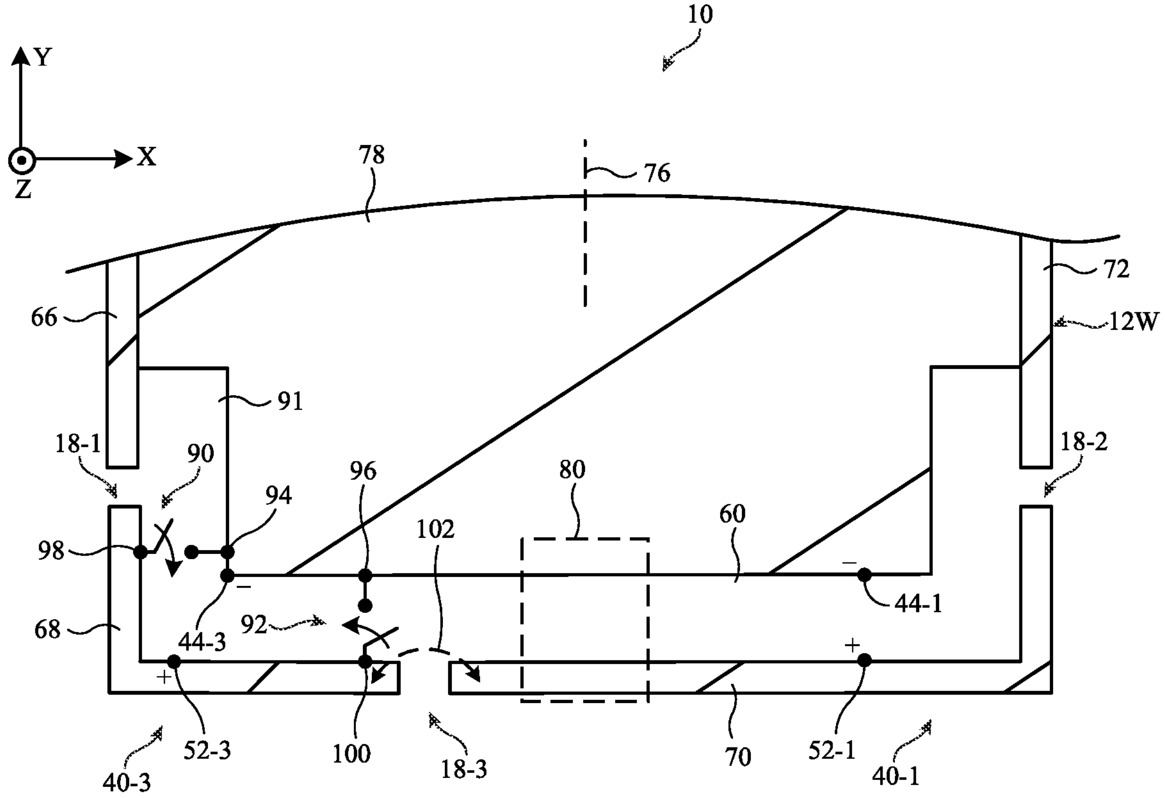
FIG. 6 is a top interior view of the lower end of an illustrative electronic device having first and second antennas that are separated by a dielectric gap, where the second antenna includes switches on opposing sides of a feed terminal for adjusting a frequency response of the antennas in accordance with some embodiments.

FIG. 6 is an interior view showing how antennas 40-1 and 40-3 may be configured to overcome these challenges to cover both relatively low frequencies such as frequencies within the cellular low band (LB) as well as relatively high frequencies such as frequencies within the cellular midband (MB) and/or the cellular high band (HB).

As shown in FIG. 6, antenna 40-3 may have an antenna resonating element arm formed from segment 68 of peripheral conductive housing structures 12W. Antenna 40-3 may be fed using a first antenna feed (e.g., a first antenna feed 50 of FIG. 3) coupled across slot 60. The first antenna feed may have a positive antenna feed terminal 52-3 coupled to segment 68 and may have a ground antenna feed terminal 44-3 coupled to ground structures 78.

Antenna 40-3 may have a first switchable return path (sometimes referred to herein as a first switchable short pin) formed from a first switch 90 coupled between point (terminal) 94 on ground structures 78 and point (terminal) 98 on segment 68. Point 98 is interposed on segment 68 between gap 18-1 and positive antenna feed terminal 52-3. Positive antenna feed terminal 52-3 is interposed on segment 68 between point 98 and gap 18-3. Point 98 may be disposed on segment 68 at or adjacent gap 18-1 if desired. Point 100 may be disposed on segment 68 at or adjacent gap 18-3 if desired.

Antenna 40-3 may also have a second switchable return path (sometimes referred to herein as a second switchable short pin) formed from a second switch 92 coupled between point (terminal) 96 on ground structures 78 and point (terminal) 100 on segment 68. Point 100 is interposed on segment 68 between gap 18-2 and positive antenna feed terminal 52-3. Ground antenna feed terminal 44-3 may be interposed on ground structures 78 between point 94 and point 96. In other words, switches 90 and 92 may be disposed on opposing sides of the antenna feed for antenna 40-3, switch 90 (e.g., the first return path for antenna 40-3) may be interposed between the antenna feed for antenna 40-3 and an extended portion 91 of slot 60 that extends between segment 66 and ground structures 78 (e.g., for forming the resonating element for antenna 40-2 of FIG. 5), and switch 92 (e.g., the second return path for antenna 40-3) may be interposed between the antenna feed for antenna 40-3 and antenna 40-1.

While depicted as a single switch 90 coupled in series between points 98 and 94 for the sake of clarity, antenna 40-3 may include one or more tuning components (e.g., inductors, capacitors, etc.) coupled in series and/or in parallel with switch 90 and/or may include multiple switches 90 coupled in series and/or in parallel between points 98 and 94. Similarly, while depicted as a single switch 92 coupled in series between points 96 and 100 for the sake of clarity, antenna 40-3 may include one or more tuning components (e.g., inductors, capacitors, etc.) coupled in series and/or in parallel with switch 92 and/or may include multiple switches 92 coupled in series and/or in parallel between points 100 and 96.

One or more of the structures of antenna 40-1 may mirror the structure of antenna 40-3 about longitudinal axis 76 if desired (e.g., despite the fact that segment 70 is longer than segment 68). Antenna 40-1 may have an antenna resonating element arm formed from segment 70 of peripheral conductive housing structures 12W. Antenna 40-1 may be fed using a second antenna feed (e.g., a second antenna feed 50 of FIG. 3) coupled across slot 60. The antenna feed of antenna 40-1 and the antenna feed of antenna 40-2 may be coupled to and fed by different respective transmission lines (e.g., transmission line 42 of FIG. 3). The antenna feed of antenna 40-1 may have a positive antenna feed terminal 52-1 coupled to segment 70 and may have a ground antenna feed terminal 44-1 coupled to ground structures 78.

If desired, positive antenna feed terminal 52-1 may be switchably coupled to an additional point (terminal) on segment 70 by a switching circuit and a conductive trace, sometimes also referred to as a trace combiner (not shown). If desired, antenna 40-1 may have one or more return paths and/or tuning components coupled between segment 70 and ground structures 78 (not shown).

A data connector such as data connector 80 may pass over slot 60 and through an opening in segment 70 (e.g., at the exterior of the device). Data connector 80 may be used to receive a mating data connector to charge a battery on device 10 and/or to convey data between device 10 and an external device. Data connector 80 may be a USB-C connector, for example. Longitudinal axis 76 of device 10 may pass through (e.g., bisect) data connector 80 if desired.

The length of the resonating element arm of antenna 40-1 (segment 70) and the length of the resonating element arm of antenna 40-3 (segment 68) may be selected so that antenna 40-1 and antenna 40-3 respectively radiate at desired operating frequencies such as frequencies in a cellular low band (e.g., a frequency band between about 600 MHz and 960 MHz), a cellular low-midband (e.g., a frequency band between about 1410 MHz and 1510 MHz), a cellular midband (e.g., a frequency band between about 1710 MHz and 2170 MHz), and/or a cellular ultra-high band (e.g., a frequency band between about 3400 MHz and 3600 MHZ). Switches 90 and 92 may be used to adjust and/or expand the frequency coverage of antenna 40-3 in one or more of these bands given the close proximity of antenna 40-1 to antenna 40-3.

For example, switches 90 and 92 in antenna 40-3 may be switched on or off to tune the frequency response of antenna 40-3 and/or antenna 40-1. Switches 90 and 92 may be, for example, single pole single throw (SPST) switches that can be opened or closed. Control circuitry 38 (FIG. 2) may provide control signals to switches 90 and 92 to toggle (e.g., open and/or close) switches 90 and 92. Opening a switch is sometimes also referred to herein as activating the switch, turning the switch on, or enabling the switch (e.g., an open switch is sometimes also referred to herein as an active switch, an ON switch, or an enabled switch). Closing a switch is sometimes also referred to herein as deactivating the switch, turning the switch off, or disabling the switch (e.g., a closed switch is sometimes also referred to herein as an inactive switch, an OFF switch, or a disabled switch).

When open, switch 90 forms an open circuit (e.g., infinite impedance) between points 98 and 94 across slot 60. Similarly, when open, switch 92 forms an open circuit (e.g., infinite impedance) between points 96 and 100. On the other hand, when closed, switch 90 forms a short circuit path (e.g., a zero or short circuit impedance) between points 98 and 94 across slot 60. Similarly, when closed, switch 92 forms a short circuit path (e.g., a zero or short circuit impedance) between points 96 and 100. As a simplest example, a given switch may be implemented using a transistor having source/drain terminals coupled between segment 68 and ground structures 78 and a gate terminal that receives a control signal that turns the switch (transistor) on or off. When turned on, an impedance less than a threshold impedance (or a transconductance greater than a threshold transconductance) is established between the source/drain terminals and current flows between the source/drain terminals. When turned off, an impedance greater than the threshold impedance (or a transconductance less than the threshold transconductance) is established between the source/drain terminals and current does not flow between the source/drain terminals. This is merely illustrative and, in general, the switches described herein may be implemented using any desired switching circuitry or architecture.

The switching circuitry of antenna 40-3 (e.g., switches 90 and 92) may be adjusted to place antenna 40-3 into a selected one of a number of different possible tuning states. Table 103 of FIG. 6 shows three illustrative tuning states for antenna 40-3. In a first tuning state A, both switch 90 and switch 92 are turned on. This forms two short circuit paths between segment 68 and ground on either side of positive antenna feed terminal 52-3. The short circuit paths formed by switches 90 and 92 serve to maximize isolation between antennas 40-1 and 40-3 (e.g., during MIMO operations) and help to boost the performance (e.g., antenna efficiency) of antenna 40-3 in a first band such as cellular midband MB and a second band such as cellular high band HB. The first tuning state may be used, for example, when peak isolation is required between antennas 40-1 and 40-3, and/or when peak midband and/or high band performance is required for antenna 40-3 (e.g., when antennas 40-1 and 40-3 are operating in a MIMO mode).

In a second tuning state B, both switch 90 and switch 92 are turned off. This forms open circuits between segment 68 and ground structures 78 on both sides of positive antenna feed terminal 52-3. This serves to minimize isolation between antenna 40-1 and 40-3, thereby maximizing electromagnetic coupling between segment 68 and segment 70 (e.g., as shown by near-field electromagnetic coupling 102 across gap 18-3). When configured in this way, segment 70 of antenna 40-1 effectively forms a parasitic antenna resonating element for antenna 40-3 (e.g., in the frequency band(s) being covered by antenna 40-3) via near-field electromagnetic coupling 102. In other words, segment 68 is directly fed (via positive antenna feed terminal 52-3) in the frequency band(s) of antenna 40-3, segment 70 is not directly fed in the frequency band(s) of antenna 40-3, and segment 68 drives (e.g., indirectly feeds) segment 70 in the frequency band(s) of antenna 40-3 via near-field electromagnetic coupling 102. This may help to boost the performance of antenna 40-3 in its corresponding frequency band(s).

At the same time, segment 68 of antenna 40-3 effectively forms a parasitic antenna resonating element for antenna 40-1 (e.g., in the frequency band(s) being covered by antenna 40-1) via near-field electromagnetic coupling 102. In other words, segment 70 is directly fed (via positive antenna feed terminal 52-1) in the frequency band(s) of antenna 40-1, segment 68 is not directly fed in the frequency band(s) of antenna 40-1, and segment 70 drives (e.g., indirectly feeds) segment 68 in the frequency band(s) of antenna 40-1 via near-field electromagnetic coupling 102. This may help to boost the antenna performance of antenna 40-1 in its corresponding frequency band(s), such as in cellular low band LB (e.g., near-field electromagnetic coupling 102 may extend the effective radiating length of antenna 40-1 in cellular low band LB to include both segment 70 and segment 68). The second tuning state may be used, for example, when peak low band performance is required for antenna 40-1 (e.g., in a single-input and single-output (SISO) mode).

In a third tuning state C, switch 90 is turned on while switch 92 is turned off. Turning switch 90 on may also serve to load point 98 using an antenna tuning component (not shown) coupled to switch 90. The non-open-circuit impedance formed between terminals 98 and 94 by switch 90 may serve to boost the performance of antenna 40-3 in one or more frequency bands such as the cellular midband MB, the cellular high band HB, and/or a wireless local area network band. On the other hand, the open circuit impedance formed between terminals 96 and 100 by switch 92 serves to boost electromagnetic coupling between segments 68 and 70 (e.g., electromagnetic near-field coupling 102), configuring segment 68 to form a parasitic antenna resonating element for segment 70 in cellular low band LB and thereby boosting the performance of antenna 40-1 in cellular low band LB. The third tuning state may be used, for example, when performing communications using carrier aggregation and/or when concurrently communicating using LTE bands and a wireless local area network band.

The example of FIG. 6 is merely illustrative and, in general, the switching circuitry of antenna 40-3 may have additional tuning states for further adjusting the coverage of antenna 40-3 and/or antenna 40-1. Antennas 40-1 and 40-3 may cover any desired frequency bands. Antenna 40-3 may be switched between tuning states as needed while communicating with external communications equipment. Additionally or alternatively, both antenna 40-1 and antenna 40-3 may include switchable components coupled between peripheral conductive housing structures 12W and ground structures 98 on opposing sides of gap 18-3.

Figure 7:
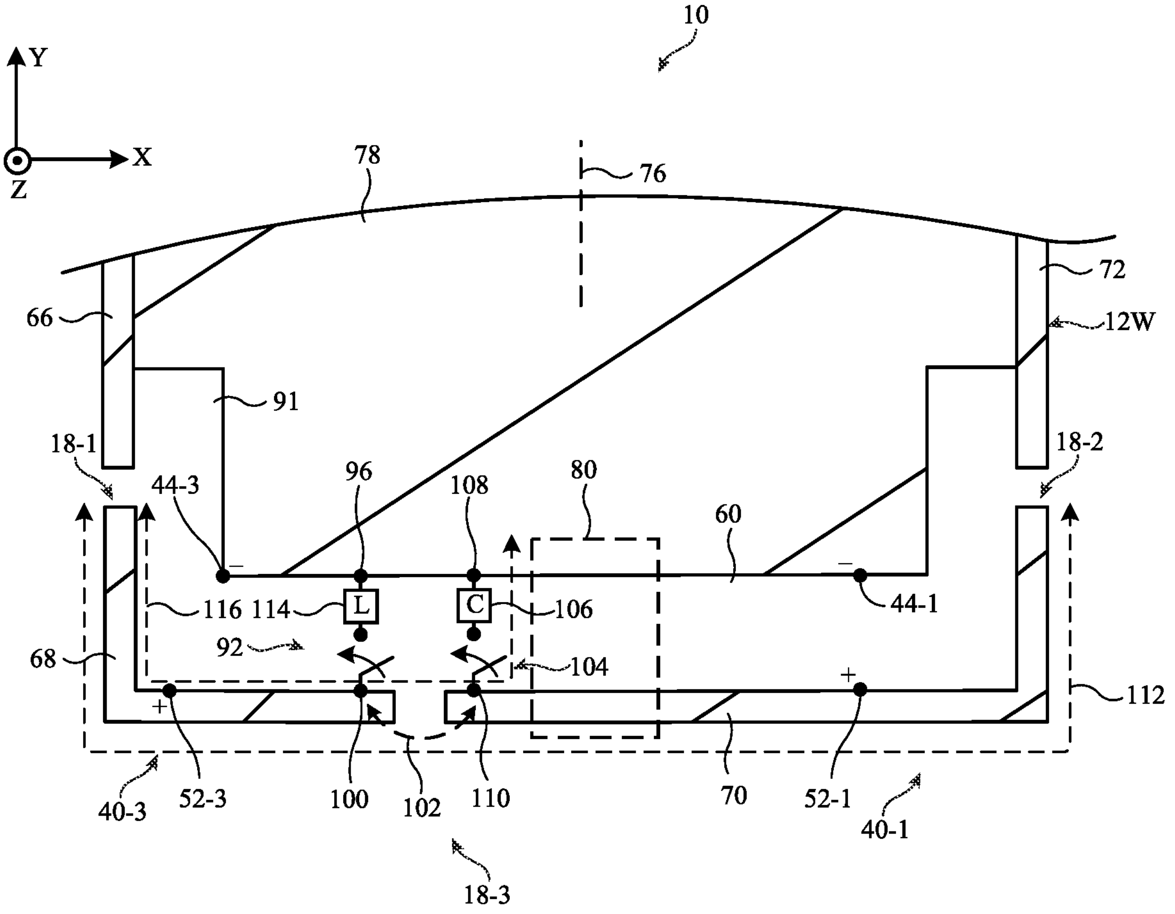
FIG. 7 is a top interior view of the lower end of an illustrative electronic device having first and second antennas that are separated by a dielectric gap, where the first and second antennas include switches on opposing of the dielectric gap for adjusting a frequency response of the antennas in accordance with some embodiments.

FIG. 7 is an interior view showing how antennas 40-1 and 40-3 may include switchable components coupled between peripheral conductive housing structures 12W and ground structures 98 on opposing sides of gap 18-3. As shown in FIG. 7, antenna 40-3 may further include a tuning component 114 (e.g., one or more inductors L) coupled between terminals 96 and 100 (e.g., in series and/or in parallel with switch 92).

Antenna 40-1 may have a switchable return path (sometimes referred to herein as a second switchable short pin) formed from a switch 104 coupled between point (terminal) 108 on ground structures 78 and point (terminal) 110 on segment 70. Point 110 is interposed on segment 70 between gap 18-3 and positive antenna feed terminal 52-1. If desired, point 110 may be disposed on segment 70 at or adjacent gap 18-3 (e.g., may be interposed on segment 70 between gap 18-3 and data connector 80). Point 108 may be interposed on ground structures 78 between ground antenna feed terminal 44-1 (or equivalently data connector 80) and point 96. In other words, switches 92 and 104 may be disposed on opposing sides of gap 18-3. Antenna 40-1 may further include a tuning component 106 (e.g., one or more capacitors C) coupled between terminals 110 and 108 (e.g., in series and/or in parallel with switch 104).

Although switch 104 and tuning component 106 are coupled between segment 70 of antenna 40-1 and ground structures 78, switch 104 and tuning component 106 may be used to adjust the frequency response of antenna 40-1. More particularly, switch 104 may be toggled (e.g., turned on or off) to adjust the frequency response of antenna 40-1 via near-field electromagnetic coupling 102 across gap 18-3. Switch 92 and tuning component 114 may also contribute to the frequency response of antenna 40-3.

For example, when switch 104 and switch 92 are both turned off (open), electromagnetic coupling between segments 68 and 70 is maximized (e.g., via near-field electromagnetic coupling 102 across gap 18-3). This may cause segment 70 to form a parasitic antenna resonating element for segment 68 in one or more bands such as cellular low band LB (e.g., where positive antenna feed terminal 52-3 is fed using signals in cellular low band LB), effectively extending the resonating length of antenna 40 to include both segments 68 and 70 (e.g., across gap 18-3), as shown by path 112. This may serve to boost the performance (antenna efficiency) of antenna 40-3 in cellular low band LB.

On the other hand, when switches 104 and 92 are both turned on (closed), electromagnetic coupling across gap 18-2 is reduced. However, near-field electromagnetic coupling 102 still provides a current path for antenna 40-3 in one or more frequency bands (e.g., the cellular mid-high band (MHB)). Antenna currents at these frequencies flow along segment 68, are produced on segment 70 across gap 18-3 (e.g., via near-field electromagnetic coupling 102), and are shorted to point 108 on ground structures 78 through switch 104 and tuning component 106. This may serve to boost the performance of antenna 40-3 in the corresponding frequency band(s) (e.g., in the cellular mid-high band). Some of the current may also be shorted from segment 68 to point 96 through switch 92 and tuning component 114. The impedance of tuning components 114 and/or 106 may help to tune the frequency response of antenna 40-3.

Figure 8:
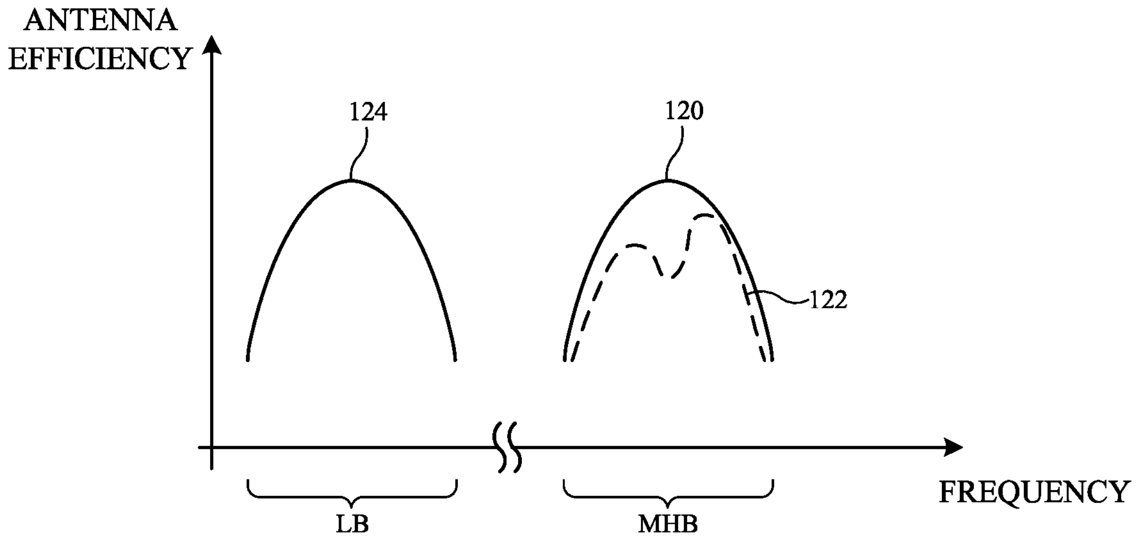
FIG. 8 is a plot of antenna performance (antenna efficiency) as a function of frequency showing how the switches of FIG. 7 may adjust a frequency response of the antennas in accordance with some embodiments.

FIG. 8 is a plot of antenna performance (antenna efficiency) of antenna 40-3 showing how switches 92 and 104 of FIG. 7 may optimize the performance of antenna 40-3 across different frequency bands. Curve 124 plots the response peak of antenna 40-3 when switches 92 and 104 are open. As shown by curve 124, opening switches 92 and 104 maximizes electromagnetic coupling between segments 68 and 70 to boost the performance of antenna 40-3 in cellular low band LB.

Figure 9:
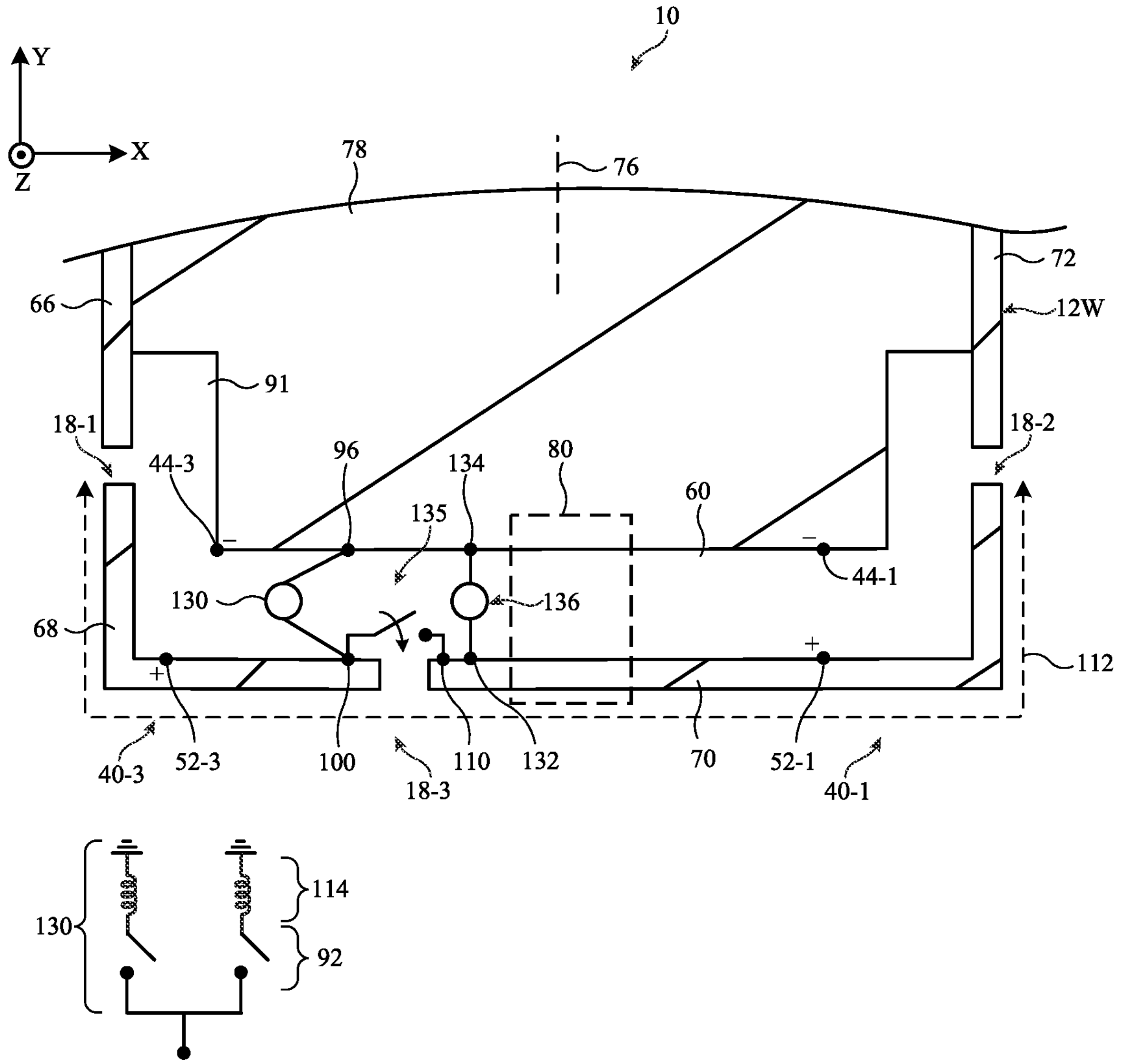
FIG. 9 is a top interior view of the lower end of an illustrative electronic device having first and second antennas that are separated by a dielectric gap, where a switch is coupled between the first and second antennas across the gap for adjusting a frequency response of the antennas in accordance with some embodiments.

Curve 122 plots the response of antenna 40-3 in the absence of switch 104 and tuning component 106. As shown by curve 122, near-field electromagnetic coupling from antenna 40-1 can produce a reduction in antenna efficiency at one or more frequencies within the cellular mid-high band MHB. Curve 120 plots the response of antenna 40-3 when switch 104 is turned on. As shown by curve 120, using switch 104 to form a current path between points 110 and 108 through tuning component 106 may serve to boost the performance of antenna 40-3 in cellular mid-high band MHB. The example of FIG. 8 is merely illustrative. In practice, curves 120-124 may have other shapes and the antenna(s) may have response peaks at any desired frequencies. In the examples of FIGS. 6 and 7, near-field electromagnetic coupling 102 across gap 18-3 is leveraged to boost the performance of antenna 40-3 and/or 40-1 in one or more frequency bands. Additionally or alternatively, a switch may be coupled between segments 68 and 70 across gap 18-3 to boost the performance of antenna 40-3 and/or 40-1 in one or more frequency bands (e.g., without leveraging near-field electromagnetic coupling 102). FIG. 9 is an interior view showing a switch may be coupled between segments 68 and 70 across gap 18-3 to boost the performance of antenna 40-3 and/or 40-1 in one or more frequency bands.

As shown in FIG. 9, antenna 40-3 may include a tuning component 130 coupled between points 100 and 96. Tuning component 130 may include one or more switches 92 coupled in series and/or in parallel with one or more inductors 114. In the example of FIG. 9, tuning component 130 includes multiple series-coupled switches 92 and inductors 114 coupled in parallel between points 100 and 96. Tuning component 130 (e.g., switch(es) 92) may be adjusted to tune the frequency response of antenna 40-3 in one or more frequency bands.

Antenna 40-1 may include a tuning component 136 coupled between point 134 on ground structures 78 and point 132 on segment 70. Tuning component 136 may include one or more switches, inductors, and/or capacitors coupled in series and/or in parallel between points 132 and 134. Point 134 may be interposed on ground structures 78 between point 96 and ground antenna feed terminal 44-1 (or equivalently data connector 80). Point 132 may be interposed on segment 70 between point 110 and positive antenna feed terminal 52-1 (or equivalently data connector 80). If desired, antenna 40-1 may have an additional tuning component (not shown) coupled between segment 70 and ground structures 78 on the opposite side of data connector 80. These tuning components may be adjusted to tune the frequency response of antenna 40-1 and/or to decouple the effect of data connector 80 on antenna performance.

As shown in FIG. 9, an additional switch 135 may be coupled between terminal 100 and terminal 110 across gap 18-3. Switch 135 may be toggled (opened or closed) to further tune the frequency response of antenna 40-3 and/or antenna 40-1 in one or more frequency bands. For example, when switch 135 is open, an open circuit impedance is established between points 100 and 110 (across gap 18-3). This state may be used to tune the response of antenna 40-1 in cellular low band LB (e.g., while positive antenna feed terminal 52-1 conveys radio-frequency signals in the cellular low band) to relatively low frequencies.

On the other hand, when switch 135 is closed, a short circuit impedance is established between points 100 on segment 68 and point 110 on segment 70 across gap 18-3.

This effectively extends the radiating length of antenna 40-1 in cellular low band LB from only including segment 70 to also including segment 68 (e.g., as shown by path 112). In addition, despite being used to tune the frequency response of antenna 40-3, tuning element 130 may additionally or alternatively contribute to the frequency response of antenna 40-1 in cellular low band LB while switch 135 is closed (e.g., because the antenna currents in cellular low band LB conveyed onto segment 68 from segment 70 will thereby see the impedance established by tuning component 130 between points 100 and 96).

The state of tuning component 130 may be adjusted to tune the frequency response of antenna 40-1 in cellular low band LB (while switch 135 is closed). Tuning component 130 may, for example, have a first set of one or more states that configure tuning component 130 to tune the frequency response of antenna 40-3 in the frequency band(s) of antenna 40-3 (e.g., when switch 135 is open or closed) and may also have a second set of one or more states that configure tuning component 130 to tune the frequency response of antenna 40-3 in cellular low band LB when switch 135 is closed. This may serve to boost the frequency response of antenna 40-1 in cellular low band LB when needed. This may also allow for low band tuning of antenna 40-1 in situations where the display of device 10 contributes increased display capacitance to the antenna(s) (e.g., when there is decreased lateral separation between conductive structures in the display and peripheral conductive housing structures 12W so as to maximize the active area of the display).

Figure 10:
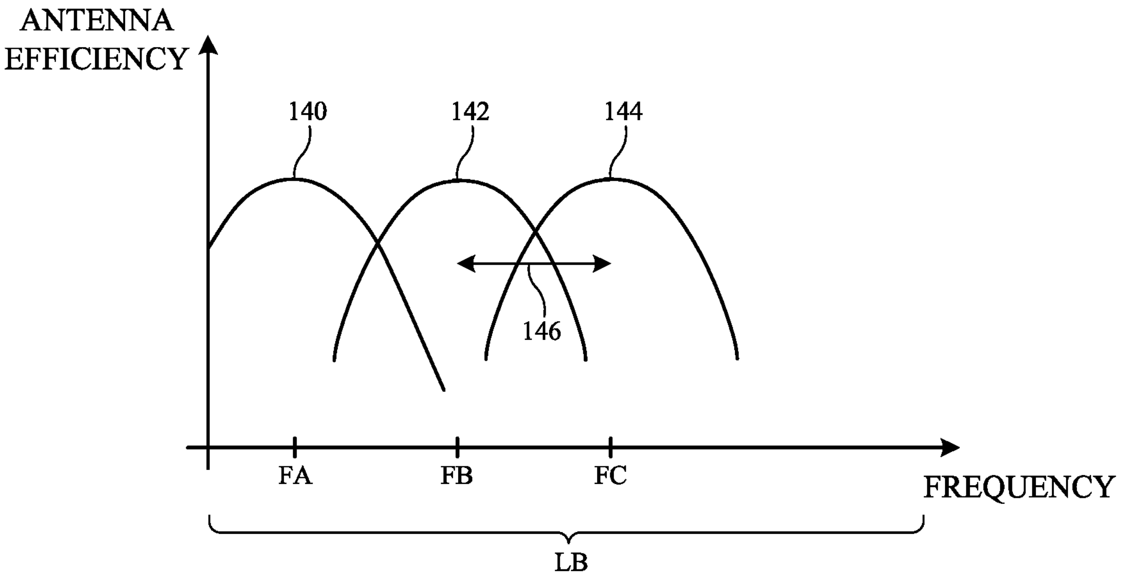
FIG. 10 is a plot of antenna performance (antenna efficiency) as a function of frequency showing how the switch of FIG. 9 may adjust a frequency response of the antennas in accordance with some embodiments.

FIG. 10 is a plot of antenna performance (antenna efficiency) of antenna 40-1 showing how switch 135 of FIG. 9 may adjust the response of antenna 40-1 across cellular low band LB. Curve 140 plots the response of antenna 40-1 when switch 135 is open. As shown by curve 140, opening switch 135 pushes the response of antenna 40 to relatively low frequencies in cellular low band LB (e.g., centered at frequency FA).

Curve 142 plots the response of antenna 40-1 in when switch 135 is closed and tuning circuit 130 of antenna 40-1 is in a first tuning state. Curve 144 plots the response of antenna 40-1 in when switch 135 is closed and tuning circuit 130 of antenna 40-1 is in second first tuning state. As shown by curves 142 and 144, closing switch 135 may push the response of antenna 40-1 to higher frequencies in cellular low band LB (e.g., counteracting increased capacitance from the display). As shown by arrow 146, adjusting the tuning state of tuning component 130 while switch 135 is closed serves to fine tune the response of antenna 40-1 in cellular low band LB (e.g., between frequencies FB and FC). Frequencies FB and FC may be respective transmit and receive bands of sub-band B8 of cellular low band LB, as an example. The example of FIG. 10 is merely illustrative. In practice, curves 140-144 may have other shapes and antenna 40-1 may have response peaks at any desired frequencies.

The implementations of FIGS. 6, 7, and 9 are illustrated separately for the sake of clarity. If desired, the implementations of two or more (e.g., all) of FIGS. 6, 7, and 9 may be combined. For example, in one implementation, device 10 includes switch 90 coupled between points 98 and 94 (FIG. 6), switch 92 coupled between terminals 100 and 96 (FIG. 6), a tuning component 114 coupled between switch 92 and point 96 (FIG. 7), switch 104 and tuning component 106 coupled between points 110 and 108 (FIG. 7), tuning component 130 coupled between points 100 and 96 (FIG. 9), and tuning component 136 coupled between points 132 and 134 (FIG. 9). In another implementation, device 10 includes switch 90 coupled between points 98 and 94 (FIG. 6), switch 92 coupled between terminals 100 and 96 (FIG. 6), tuning component 130 coupled between points 100 and 96 (FIG. 9), and tuning component 136 coupled between points 132 and 134 (FIG. 9). In another implementation, device 10 includes switch 90 coupled between points 98 and 94 (FIG. 6), switch 92 coupled between terminals 100 and 96 (FIG. 6), a tuning component 114 coupled between switch 92 and point 96 (FIG. 7), switch 104 and tuning component 106 coupled between points 110 and 108 (FIG. 7). In yet another implementation, device 10 includes a tuning component 114 coupled between switch 92 and point 96 (FIG. 7), switch 104 and tuning component 106 coupled between points 110 and 108 (FIG. 7), tuning component 130 coupled between points 100 and 96 (FIG. 9), and tuning component 136 coupled between points 132 and 134 (FIG. 9).

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures having a first segment, a second segment separated from the first segment by a first dielectric-filled gap, and a third segment separated from the second segment by a second dielectric-filled gap;

ground structures separated from the peripheral conductive housing structures by a slot;

a first positive antenna feed terminal coupled to the first segment;

a second positive antenna feed terminal coupled to the second segment;

a first switch coupled between a first point on the second segment and the ground structures across the slot; and a second switch coupled between a second point on the second segment and the ground structures across the slot, the first point being interposed on the second segment between the second positive antenna feed terminal and the first dielectric-filled gap, and the second point being interposed on the second segment between the second positive antenna feed terminal and the second dielectric-filled gap, wherein the first switch and the second switch have a first tuning state in which the first switch is closed and the second switch is closed, and the second segment is configured to radiate in a first frequency band and a second frequency band while the first switch and the second switch are in the first tuning state, the second frequency band being higher than the first frequency band.

2. The electronic device of claim 1, wherein the first switch and the second switch have a second tuning state in which the first switch is open and the second switch is open.

3. The electronic device of claim 2, wherein the first switch and the second switch have a third tuning state in which the first switch is open and the second switch is closed.

4. The electronic device of claim 3, wherein the second segment forms a parasitic antenna resonating element for the first segment in a first frequency band while the first switch and the second switch are in the second tuning state.

5. The electronic device of claim 4, wherein the second segment forms the parasitic antenna resonating element for the first segment in the first frequency band while the first switch and the second switch are in the third tuning state.

6. The electronic device of claim 5, wherein the second segment exhibits greater isolation from the first segment while the first switch and the second switch are in the first tuning state than while the first switch and the second switch are in the second tuning state.

7. The electronic device of claim 5, wherein the second segment exhibits greater antenna efficiency in the second frequency band while the first switch and the second switch are in the third tuning state than while the first switch and the second switch are in the second tuning state.

8. The electronic device of claim 1, wherein the electronic device has a rectangular periphery, the first dielectric-filled gap is located along a first side of the rectangular periphery, and the second dielectric-filled gap is located along a second side of the rectangular periphery.

9. The electronic device of claim 1, further comprising a data connector that extends through the first segment.

10. The electronic device of claim 1, wherein the first segment comprises a first bend at a first corner of the electronic device and the second segment comprises a second bend at a second corner of the electronic device.

11. The electronic device of claim 10, further comprising:

a data connector that is aligned with an opening in the first segment.

12. The electronic device of claim 1, wherein:

the first switch and the second switch have a second tuning state in which the first switch is open and the second switch is open, and the second segment is configured to radiate in the first frequency band but not the second frequency band while the first switch and the second switch are in the second tuning state.

13. The electronic device of claim 12, wherein:

the first switch and the second switch have a third tuning state in which the first switch is open and the second switch is closed, and the second segment is configured to radiate in the first frequency band, the second frequency band, and a third frequency band while the first switch and the second switch are in the third tuning state, the third frequency band being higher than the second frequency band.

14. The electronic device of claim 1, wherein:

the first switch and the second switch have a second tuning state in which the first switch is open and the second switch is closed, and the second segment is configured to radiate in the first frequency band, the second frequency band, and a third frequency band while the first switch and the second switch are in the third tuning state, the third frequency band being higher than the second frequency band.

15. The electronic device of claim 1, further comprising:

an inductor coupled between the first switch and the ground structures;

a third switch coupled between the first segment and the ground structures across the slot;

a capacitor coupled between the third switch and the ground structures;

a fourth switch coupled between the first segment and the second segment across the first dielectric-filled gap; and a universal serial bus connector aligned with a hole in the first segment, wherein the first switch and the second switch have a second tuning state in which the first switch is open and the second switch is open, and the first switch and the second switch have a third tuning state in which the first switch is open and the second switch is closed.

16. The electronic device of claim 1, further comprising:

an inductor coupled between the first switch and the ground structures;

a third switch coupled between the first segment and the ground structures across the slot; and a capacitor coupled between the third switch and the ground structures.

17. The electronic device of claim 16, further comprising:

a universal serial bus connector aligned with a hole in the first segment, wherein the first switch and the second switch have a second tuning state in which the first switch is open and the second switch is open, and the first switch and the second switch have a third tuning state in which the first switch is open and the second switch is closed.

18. An electronic device comprising:

peripheral conductive housing structures having a first segment, a second segment separated from the first segment by a first dielectric-filled gap, and a third segment separated from the second segment by a second dielectric-filled gap;

ground structures separated from the peripheral conductive housing structures by a slot;

a first positive antenna feed terminal coupled to the first segment;

a second positive antenna feed terminal coupled to the second segment;

a first switch coupled between a first point on the second segment and the ground structures across the slot; and a second switch coupled between a second point on the second segment and the ground structures across the slot, the first point being interposed on the second segment between the second positive antenna feed terminal and the first dielectric-filled gap, and the second point being interposed on the second segment between the second positive antenna feed terminal and the second dielectric-filled gap, wherein the first switch and the second switch have a first tuning state in which the first switch is closed and the second switch is closed, the first switch and the second switch have a second tuning state in which the first switch is open and the second switch is open, the first switch and the second switch have a third tuning state in which the first switch is open and the second switch is closed, and the second segment forms a parasitic antenna resonating element for the first segment in a first frequency band while the first switch and the second switch are in the third tuning state.

19. The electronic device of claim 18, wherein the second segment exhibits greater isolation from the first segment while the first switch and the second switch are in the first tuning state than while the first switch and the second switch are in the second tuning state.

20. The electronic device of claim 18, wherein the second segment exhibits greater antenna efficiency in a second frequency band higher than the first frequency band while the first switch and the second switch are in the third tuning state than while the first switch and the second switch are in the second tuning state.

* * * * *